Patented Apr. 27, 1937

2,078,238

UNITED STATES PATENT OFFICE 2,078,238

SEPARATION OF ETHYLENE FROM ITS HOMOLOGUES

Robert R. Dreisbach, Midland, Mich., assignor to The Dow Chemical Company, Midland, Mich., a corporation of Michigan No Drawing. Application May 7, 1935, Serial No. 20,299

15 Claims. (Cl. 260—170)

This invention concerns a method of separating ethylene from higher olefines. The invention is particularly concerned with removing olefines higher than ethylene from cracked-oil gas to leave a hydrocarbon mixture rich in ethylene, which may be employed directly for the production of substantially pure ethylene derivatives, e. g. ethyl alcohol, ethyl acetate, ethylene chloride, etc.

It is known that ethylene is less reactive with a polynuclear aromatic hydrocarbon such as naphthalene, in the presence of aluminum chloride, than are the higher olefines, and ethylene has been separated from mixtures thereof with higher olefines by selectively reacting the latter with naphthalene. However, ethylene has not previously been separated from a higher olefine, e. g. propylene, by selectively reacting a mixture of the latter and ethylene with a mononuclear aromatic compound of the benzene series, whereby the propylene is reacted, leaving the ethylene substantially pure. In fact, it has been reported, J. A. C. S. 49, 3144 (1927), that in the presence of aluminum chloride as catalyst "propylene is taken up by benzene under the same conditions as ethylene, but only about 4 per cent as rapidly", indicating that it would be impossible satisfactorily to separate ethylene from propylene by reaction with benzene, since the ethylene would react more readily than the propylene. The experiments upon which the above-quoted generalization was drawn were carried out at temperatures between 60° and 90° C.

I have now discovered that benzene and simple derivatives thereof containing less than 5 substituents on the benzene nucleus, e. g. ethoxybenzene, diphenyl oxide, bromobenzene, dichlorobenezene, diethyl-benzene, chloro-triisopropylbenzene, etc., can be reacted with olefines in the presence of aluminum chloride at temperatures below 50° C.; and that at such low temperatures, propylene and the butylenes are far more reactive with a benzene compound than is ethylene. By a "benzene compound" is meant benzene or a simple derivative thereof (containing the benzene nucleus) which does not react with olefines in the absence of a Friedel-Craft catalyst, e. g. one of the benzene derivatives mentioned above. I have further discovered that by treating a hydrocarbon mixture containing ethylene and propylene or a butylene with a benzene compound in the presence of aluminum chloride at a reaction temperature below 50° C., preferably between 10° and 40° C., the olefines higher than ethylene may selectively be reacted with the benzene compound to form alkyl derivatives thereof leaving the ethylene substantially free of other olefines.

I have also found that the rate of reaction between an olefine and a benzene compound is influenced greatly both by the condition of the aluminum chloride used as a catalyst and by the pressure at which the reaction is carried out. For instance, aluminum chloride may be rendered extremely active as a catalyst by being permitted to stand for several hours in contact with an aromatic compound, e. g. benzene, toluene, etc., prior to use in the desired reaction. Although I may employ such highly activated aluminum chloride in separating ethylene from higher olefines by the present method, the separation can usually be carried out more satisfactorily by using a less active form of the catalyst, such as fresh aluminum chloride or the aluminum chloride ferment from a prior reaction between an olefine and an aromatic compound. By an "aluminum chloride ferment" from such prior reaction, I refer to that portion of a previously reacted mixture which is rich in aluminum chloride. The rate of reaction may in all instances be increased by raising the pressure at which the reaction is carried out.

An object of the present invention is to provide a method whereby ethylene may readily and economically be separated from a mixture thereof with higher olefines by selectively reacting the latter with certain agents, e. g. chlorine and benzene compounds, to form valuable products, e. g. olefine chlorides and alkylated benzene compounds. Other objects will be apparent from the description and examples herein presented. To the accomplishment of the foregoing and related ends, the invention consists in the method of separating ethylene from its homologues hereinafter fully described and particularly pointed out in the claims.

Since my method is particularly well adapted to the removal of olefines other than ethylene from cracked-oil gas, the invention will be described in connection therewith, it being understood that the invention may also be applied in removing olefines higher than ethylene from any hydrocarbon mixture containing ethylene and either propylene or a butylene, regardless of the source of such mixture.

Cracked-oil gas is a hydrocarbon mixture rich in ethylene, but also containing propylene, one or more of the isomeric butylenes, and a small proportion of higher olefines, e. g. amylenes. If desired, the olefines higher than ethylene may be removed from such mixture by passing the latter into a liquid benzene compound, containing aluminum chloride, while stirring and maintaining the liquid mixture at a temperature below 50° C., but during such operation the olefines higher than butylene are frequently polymerized to form tars. Accordingly, I prefer to remove the amylenes and higher olefines from cracked-oil gas prior to reacting the latter with a benzene compound. This may be accomplished in any of a number of known ways, e. g. by treating the crude gas mixture with sufficient chlorine to react with the olefines higher than butylene and removing the resultant chlorohydrocarbons; by scrubbing the crude gas with sulphuric acid of such concentration that only the olefines higher than butylene react therewith; etc. If desired, such preliminary treatment may be carried out in such manner as to remove all olefines higher than propylene from cracked-oil gas, in which case the subsequent reaction with a benzene compound results in the production of corresponding isopropyl benzene compounds as substantially the only products.

After removal of the higher olefines, e. g. amylenes, etc., from cracked-oil gas, the residual gas, which contains ethylene and propylene and may contain butylenes, is treated with a mixture of a benzene compound and aluminum chloride while stirring and maintaining the reaction mixture at a temperature below 50° C., preferably between 10° and 40° C. Such treatment may be carried out at atmospheric pressure or lower, but the reaction proceeds more rapidly at higher pressures. In practice, I prefer to pass the gas through the benzene-aluminum chloride mixture under a pressure between 10 and 50 pounds per square inch gauge, but even higher pressures may be applied if desired. The benzene compound employed as a reactant in carrying out such treatment may be benzene or a simple derivative thereof such as ethoxybenzene, dimethoxybenzene, bromobenzene, trichlorobenzene, diethylbenzene, triisopropylbenzene, etc. The aluminum chloride is preferably used in a proportion representing between 0.01 and 0.03 molecular equivalent of the benzene compound, but may be employed in smaller or larger proportion if desired. By such treatment the propylene and any butylene present in the gas mixture is selectively reacted with the benzene compound, leaving the residual gas rich in ethylene but substantially free of other olefines.

The process may be conducted in batch manner, if desired, but in practice I prefer to operate continuously as follows. Cracked-oil gas is treated with sufficient chlorine to react with the olefines higher than butylene which may be present, whereby such higher olefines are converted at about room temperature into corresponding liquid olefine chlorides which condense on formation and are thereby separated from the residual gas. Such liquid olefine chlorides may be withdrawn from the chlorination apparatus without interrupting the flow of gas.

The residual gas mixture is passed in continuous flow through a body of one of the hereinbefore mentioned benzene compounds, containing aluminum chloride as catalyst, while stirring the reaction mixture and maintaining the same at a temperature below 50° C., preferably between 10° and 40° C. By such treatment the propylene and butylenes are selectively reacted with the benzene compound to form alkylated derivatives thereof, leaving a gas mixture rich in ethylene but substantially free of other olefines. The rate at which the gas mixture may be passed through the liquid reaction mixture and still obtain effective removal of propylene and butylenes varies with changes in the pressure at which the reaction is carried out, the benzene compound used as a reactant, the efficiency of stirring, etc. I have successfully stripped propylene and butylenes from a gaseous hydrocarbon mixture consisting of about 40 per cent by volume ethylene, 12 per cent propylene, 6 per cent butylenes, and the remainder saturated hydrocarbons, by passing said mixture under a pressure of about 20 pounds per square inch gauge and at a rate of 600 cubic feet per hour through a quantity of 600 pounds benzene containing 25 pounds aluminum chloride, while stirring and maintaining the liquid reaction mixture at 40° C.

After the reaction is completed, the liquid reaction mixture frequently separates into two distinct layers, an upper layer rich in alkylated benzene compounds and a lower layer containing most of the aluminum chloride. The lower layer may be separated and re-employed as a catalyst in a successive reaction and the upper layer may be distilled or fractionally crystallized to separate the alkylated benzene compound. In some instances, particularly when the liquid reaction mixture does not separate into distinct layers, I find it advantageous to destroy or remove the aluminum chloride contained in such mixture, e. g. by washing with water or an aqueous solution of a mineral acid or base, by treating the mixture with moist sodium carbonate or other base and then filtering, etc., and thereafter to separate the alkylated benzene compounds as mentioned above.

After removing olefines other than ethylene from cracked-oil gas, the residual gas, which is rich in ethylene, may be employed as an agent for the production of ethylene derivatives, e. g. ethylene bromide, ethyl alcohol, etc., which are more pure than when prepared directly from crude cracked-oil gas.

The following examples illustrate certain ways in which the principle of my invention has been applied, but are not to be construed as limiting the invention.

*Example 1*

A cracked-oil gas, consisting of about 40 per cent by volume ethylene, 12 per cent propylene, 6 per cent butylene, 4 per cent higher olefines, and the remainder saturated hydrocarbons, was passed in continuous flow at a rate of about 530 cubic feet per hour (at about 20° C. and 20 pounds pressure per square inch gauge) into a chlorination chamber wherein it was mixed and reacted at about room temperature with gaseous chlorine which was simultaneously passed into said chamber at a rate of about 62.7 cubic feet per hour. By such reaction, the butylenes and higher olefines present were converted into corresponding liquid olefine chlorides, which collected in the bottom of the chlorination chamber and were periodically withdrawn therefrom without interrupting the process. The residual gas contained approximately 46.5 per cent by volume ethylene, 11 per cent propylene, and was substantially free of other olefines. Said residual gas was passed, under about 20 pounds pressure, from the chlorination chamber into 600 pounds benzene containing 12 pounds aluminum chloride while stirring and maintaining the mixture at temperatures between 15° and 20° C. The gas issuing from the benzene-aluminum chloride mixture was found to contain 48.3 per cent by volume of ethylene and only about 1.2 per cent of other unsaturated hydrocarbons, which, however, did not appear to be simple olefines. After operating for 18 hours in such manner there was obtained 7250 cubic feet (at 20° C. and about 20 pounds pressure gauge) of such gas. The liquid mixture produced by reaction of the propylene with benzene separated on standing into two layers, a lower layer rich in aluminum chloride and an upper layer containing the alkylated benzene products. The upper layer, which weighed 716 pounds, was separated, washed successively with water and aqueous sodium hydroxide to remove any aluminum chloride contained therein, and dried. 626 pounds of the washed material was distilled, whereby 387 pounds of unreacted benzene and 86 pounds of monoisopropylbenzene were collected as distillates, leaving 153 pounds of a still residue consisting chiefly of polyisopropylbenzenes.

*Example 2*

Following procedure similar to that described in Example 1, cracked-oil gas, containing about 40 per cent by volume ethylene, 12 per cent propylene, 6 per cent butylenes, 4 per cent higher olefines, and the remainder saturated hydrocarbons, was reacted first with sufficient chlorine to convert the olefines higher than butylene into corresponding liquid olefine chlorides, leaving a gaseous hydrocarbon mixture containing approximately 42 per cent ethylene and 14 per cent propylene and butylenes, but substantially free of higher olefines. Said residual gas was passed under 20 pounds per square inch pressure and at rates varying from 520 to 630 cubic feet per hour through a quantity of 900 pounds trichlorobenzene containing 30 pounds of aluminum chloride, while stirring and maintaining the reaction mixture at about 20–25° C. The gas issuing from the liquid reaction mixture contained approximately 51.5 per cent by volume ethylene and less than 2 per cent of higher olefines. By treating 9700 cubic feet (20° C. and 20 pounds pressure gauge) of crude cracked-oil gas in the above manner, I obtained approximately 7900 cubic feet of residual gas having the analysis just stated and 1135 pounds of a liquid mixture produced by reaction of the higher olefines with the trichlorobenzene. The liquid mixture was washed successively with water and aqueous sodium hydroxide to remove aluminum chloride therefrom and then distilled. There was collected 840 pounds of unreacted trichlorobenzene as distillate, leaving 166 pounds of a mixture of alkylated trichlorobenzenes as a still residue, which was an extremely viscous liquid at room temperature.

Although I prefer aluminum chloride as catalyst in selectively reacting an olefine higher than ethylene with a benzene compound by my method, other highly active catalysts of the class known to promote reactions of the Friedel-Craft type may be employed instead. For instance, I may employ aluminum bromide, or a mixture of an aluminum halide and another Friedel-Craft catalyst, e. g. ferric chloride, stannic chloride, etc., in carrying out such reaction.

Although I prefer to employ a liquid benzene compound as a reactant in separating ethylene from its homologues by my method, instances may arise wherein it is desired to employ a solid benzene compound, e. g. a tetrachlorobenzene, for such purpose. In such instances, the reaction may be carried out in the presence of carbon bisulphide, or other solvent for the benzene compound which is less reactive with an olefine than is the benzene compound.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:—

1. The method which comprises separating ethylene from admixture with a higher olefine by selectively reacting the latter with a benzene compound at a reaction temperature below 50° C. in the presence of a catalyst capable of promoting a Friedel-Craft reaction.

2. In a method of separating ethylene from admixture with a higher olefine selected from the class consisting of propylene and the butylenes, the step which consists in selectively reacting said higher olefine with a benzene compound in the presence of aluminum chloride as catalyst at a reaction temperature below 50° C.

3. In a method of separating ethylene from admixture with a higher olefine selected from the class consisting of propylene and butylenes, the step which consists in selectively reacting said higher olefine with a benzene compound containing less than 5 nuclear substituents at a reaction temperature between about 10° and about 40° C. in the presence of aluminum chloride.

4. In a method of separating ethylene from admixture with a higher olefine selected from the class consisting of propylene and butylenes, the step which consists in selectively reacting said higher olefine with benzene at a reaction temperature below 50° C. in the presence of aluminum chloride.

5. The method which comprises passing a hydrocarbon mixture containing ethylene and a higher olefine selected from the class consisting of propylene and butylenes into a benzene compound, containing less than 5 nuclear substituents, intermixed with aluminum chloride, while stirring and maintaining the mixture at a reaction temperature below 50° C. whereby said higher olefine is selectively reacted with the benzene compound to form an alkylated derivative thereof, leaving the ethylene relatively free of other olefines.

6. The method which comprises passing a gaseous hydrocarbon mixture containing ethylene and a higher olefine selected from the class consisting of propylene and butylenes into a benzene compound, containing between 0.01 and 0.03 its molecular equivalent of aluminum chloride, while stirring and maintaining the last mentioned mixture at a reaction temperature between about 10° and about 40° C. whereby said higher olefine is selectively reacted with the benzene compound to form an alkylated derivative thereof, leaving the ethylene relatively free of other olefines.

7. In a method of treating cracked-oil gas, the steps which consist in removing from said gas all olefines higher than butylene and treating the residual gas with a benzene compound, containing less than 5 nuclear substituents, intermixed with aluminum chloride, at a reaction temperature below 50° C. whereby the olefines higher than ethylene are reacted with the benzene compound to form an alkylated derivative thereof, leaving a gaseous hydrocarbon mixture rich in ethylene, but relatively free of other olefines.

8. The method which comprises separating ethylene from admixture with a higher olefine by selectively reacting the latter with a benzene compound at a pressure somewhat above atmospheric and a reaction temperature below 50° C. in the presence of a catalyst capable of promoting a Friedel-Craft reaction.

9. In a method of separating ethylene from admixture with a higher olefine selected from the class consisting of propylene and the butylenes, the step which consists in selectively reacting said higher olefine with a benzene compound in the presence of aluminum chloride as catalyst at a pressure somewhat above atmospheric and a reaction temperature below 50° C.

10. In a method of separating ethylene from admixture with a higher olefine selected from the class consisting of propylene and the butylenes, the step which consists in selectively reacting said higher olefine with a benzene compound containing less than 5 nuclear substituents at a pressure somewhat above atmospheric and a reaction temperature between about 10° and about 40° C. in the presence of aluminum chloride.

11. In a method of treating cracked-oil gas, the steps which consist in removing from said gas all olefines higher than butylene and treating the residual gas with a benzene compound containing less than 5 nuclear substituents at a pressure somewhat above atmospheric and a reaction temperature below 50° C. in the presence of aluminum chloride as reaction catalyst, whereby the olefines higher than ethylene are reacted with the benzene compound to form an alkylated derivative thereof, leaving a gaseous hydrocarbon mixture rich in ethylene, but relatively free of other olefines.

12. The method which comprises separating ethylene from admixture with a higher olefine by selectively reacting the latter with a benzene compound, which may contain not exceeding 4 nuclear substituents selected from the class consisting of halogen, alkyl, alkoxy, and aryloxy groups, at a reaction temperature below 50° C. in the presence of a Friedel-Craft catalyst.

13. The method which comprises separating ethylene from admixture with a higher olefine by selectively reacting the latter with benzene at a reaction temperature below 50° C. in the presence of a Friedel-Craft catalyst.

14. The method which comprises passing a hydrocarbon mixture containing ethylene and a higher olefine selected from the class consisting of propylene and butylenes into a benzene compound, which may contain not exceeding 4 nuclear substituents selected from the class consisting of halogen, alkyl, alkoxy, and aryloxy groups, intermixed with aluminum chloride, while stirring and maintaining the mixture at a reaction temperature below 50° C., whereby said higher olefine is selectively reacted with the benzene compound to form an alkylated derivative thereof, leaving the ethylene relatively free from other olefines.

15. The method which comprises passing a hydrocarbon mixture containing ethylene and a higher olefine selected from the class consisting of propylene and butylenes into benzene intermixed with aluminum chloride while stirring and maintaining the mixture at a reaction temperature below 50° C. whereby said higher olefine is selectively reacted with the benzene to form an alkyl benzene, leaving the ethylene relatively free of other olefines.

ROBERT R. DREISBACH.